United States Patent Office 3,365,466
Patented Jan. 23, 1968

3,365,466
2-OXA-ANDROSTANES AND THEIR PREPARATION
Seymour D. Levine, Princeton, and Allen I. Cohen, East Brunswick, N.J., assignors, by mesne assignments, to E. R. Squibb & Sons, Inc., New York, N.Y., a corporation of Delaware
No Drawing. Filed Mar. 8, 1965, Ser. No. 438,043
13 Claims. (Cl. 260—343.2)

ABSTRACT OF THE DISCLOSURE

17 - oxygenated-2-oxa-4-halo-$\Delta^4$-androstene-3-ones are prepared by treating A-nortestosterone with hydrogen peroxide to yield 17-oxygenated-2-oxa-4$\beta$,5$\beta$-epoxy-androstane-3-one, which are then treated with a hydrogen halide to give the final products. The final products possess anabolic activity.

This invention relates to new chemical compounds and, more particularly, to new steroidal substances and their method of preparation.

The new steroids of this invention can be depicted by the Formula I:

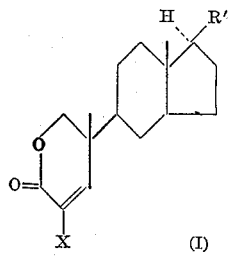

wherein X is halogen, preferably chloro and bromo; R' is hydroxy or acyloxy, or together R and R' is keto.

The new steroids of Formula I are physiologically active substances that possess anabolic activity. Hence, they can be administered orally in lieu of known anabolic agents, such as 17$\alpha$-methyltestosterone, in the treatment of hypogonadism.

The new final products of this invention are prepared by interacting a steroid of the Formula II:

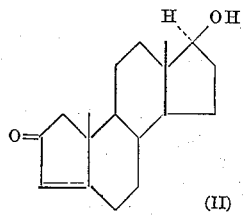

with hydrogen peroxide to yield, inter alia, new intermediates of this invention of the Formula III:

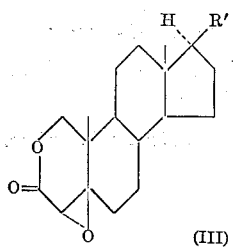

wherein R' is as hereinbefore defined.

These new intermediates are then interacted with a hydrogen halide, preferably hydrogen chloride and hydrogen bromide, to yield the final products of this invention of the Formula I.

The suitable starting steroidal is A-nortestosterone. This compound on treatment with hydrogen peroxide yields, inter alia, 4$\beta$,5$\beta$ - epoxy - 2 - oxa-adrostane-3-one-17$\beta$-ol. To prepare the other new intermediates of Formula III of this invention, either 4$\beta$,5$\beta$-epoxy-2-oxa-androstane-3-one-17$\beta$-ol is oxidized by treatment with chromium trioxide to yield 4$\beta$,5$\beta$-epoxy-2-oxa-androstane-3,17-dione, or 4$\beta$,5$\beta$-epoxy-2-oxa-androstane-3-one-16$\beta$-ol is treated with an acid anhydride or acyl halide of the desired acid to yield the 17$\beta$-ester derivative. Among the suitable acid anhydrides and acyl halides, those preferred are the anhydrides or acyl chlorides of hydrocarbon carboxylic acids of less than twelve carbon atoms, as exemplified by the lower alkanoic acids (e.g., acetic, propionic, butyric, and hexanoic acid), the lower alkenoic acids, the monocyclic aryl carboxylic acids (e.g., benzoic acid), the monocyclic aryl lower alkanoic acids (e.g., phenacetic and $\beta$-phenylpropionic acid), the monocyclic cycloalkanecarboxylic acids, the monocyclic cycloalkenecarboxylic acids, the monocyclic cycloalkane lower alkanoic acids, and the monocyclic cycloalkane lower alkenoic acids.

The resulting compounds of Formula II are then reacted with a hydrogen halide to yield the final products of this invention. If the reaction is carried out in the presence of glacial acetic acid, the compound obtained is in the form of its 17-acetate. If, however, the reaction is conducted in an inert solvent, such as chloroform and/or ethanol, then the final product is obtained in its free 17$\beta$-hydroxy form.

The following examples illustrate the invention (all temperatures being in centigrade):

EXAMPLE 1

4$\beta$,5$\beta$-epoxy-2-oxa-androstane-3-one-17$\beta$-ol

A solution of 2 g. of A-nortestosterone in 20 ml. of methanol is treated with 8 ml. of 30% hydrogen peroxide solution and 4 ml. of aqueous 4 N sodium hydroxide solution and left at room temperature for 16 hours. The reaction mixture is diluted with water and extracted five times with ether.

The aqueous phase is acidified and extracted five times with chloroform. The chloroform extracts are washed with 8% salt solution, dried over sodium sulfate and evaporated to dryness. Plate chromatography of the residue using neutral alumina (Activity V) as the adsorbent and chloroform containing 3% methanol as the developing solvent gives a major band detectable with iodine which is eluted with ethyl acetate. Crystallization of the residue from methanol-isopropyl ether gives 4$\beta$,5$\beta$-epoxy-2-oxa-androstane-3-one-17$\beta$-ol having a melting point of about 231–233°. The analytical sample is prepared by recrystallization from methanol-isopropyl ether, melting point about 231–233°; $[\alpha]_D^{26}$ +97° (chf.); $\lambda^{KBr}$ 2.86 and 5.82$\mu$; $\tau$ Si(CH$_3$)$_4$ 9.23 (s, 18-Me), 8.95 (s, 19-Me), 6.69 (s, 5-H), 6.33 (m, 17-H), and 6.00 (s, 1-CH$_2$).

Analysis.—Calcd. for C$_{18}$H$_{26}$O$_4$ (306.39): C, 70.56; H, 8.55. Found: C, 70.48; H, 8.56.

EXAMPLE 2

4$\beta$,5$\beta$-epoxy-2-oxa-androstane-3,17-dione

A solution of 250 mg. of 4$\beta$,5$\beta$-epoxy-2-oxa-androstane-3-one-17$\beta$-ol in 10 ml. of acetone is treated dropwise with stirring with a slight excess of chromium trioxide-sulfuric acid. Ethanol is added to decompose excess oxidizing agent and the acetone layer is decanted. The inorganic residue is washed with additional acetone. The acetone fractions are combined and evaporated to dryness to give 4$\beta$,5$\beta$-epoxy-2-oxa-androstane-3,17-dione.

EXAMPLE 3

*4β,5β-epoxy-2-oxa-androstane-3-one-17β-ol 17-acetate*

A mixture of 100 mg. of 4β,5β-epoxy-2-oxa-androstane-3-one-17β-ol, 0.1 ml. of pyridine, and 1 ml. of acetic anhydride is left at room temperature for 16 hours. The reaction mixture is poured into ice-water and extracted with ether. The ether extracts are washed with a saturated sodium bicarbonate solution, 8% salt solution, dried over sodium sulfate and evaporated to dryness to yield 4β,5β-epoxy-2-oxa-androstane-3-one-17β-ol 17-acetate.

In a similar manner, by substituting any other acid anhydride for the acetic anhydride in the procedure of Example 3 the corresponding ester is formed.

EXAMPLE 4

*2-oxa-4-chloro-Δ⁴-androstene-3-one-17β-ol acetate*

A solution of 158 mg. of 4β,5β-epoxy-2-oxa-androstane-3-one-17β-ol in 10 ml. of glacial acetic acid is saturated with hydrogen chloride gas and refluxed for 16 hours. The reaction mixture is concentrated and the residue taken up in chloroform. The chloroform solution is washed with saturated sodium bicarbonate solution, 8% salt solution, dried over sodium sulfate and evaporated to dryness. Plate chromatography of the residue using neutral alumina (activity V) as the adsorbent and chloroform containing 1% methanol as the developing solvent gives a major band detectable with iodine. Elution wtih ethyl acetate gives a residue which is crystallized from acetone-isopropyl ether to give 2-oxa-4-chloro-Δ⁴-androstene-3-one-17β-ol acetate having a melting point of about 212–214°. The analytical sample is prepared by recrystallization from acetone-hexane, melting point about 238.5–240.5°; $[\alpha]_D^{23}$ +145 (chf.); $\lambda^{KBr}$ 5.80, 6.22, 8.15, 9.42, and 9.63μ; $\lambda^{EtOH}$ 239 mμ (11,200); τ Si(CH$_3$)$_4$ 9.16 (s, 18-Me), 8.74 (s, 19-Me), 7.96 (s, 17-acetate), 5.97, 5.77 (q, J=11 c.p.s., 2-CH$_2$) and 5.39 (m, 17-H).

*Analysis.*—Calcd. for C$_{20}$H$_{27}$O$_4$Cl (366.87); C, 65.47; H, 7.42; Cl, 9.66. Found: C, 65.87; H, 7.80; Cl, 9.62.

EXAMPLE 5

*2-oxa-4-chloro-Δ⁴-androstene-3-one-17β-ol*

A solution of 150 mg. of 4β,5β-epoxy-2-oxa-androstane-3-one-17β-ol in 13 ml. of chloroform and 2 ml. of ethanol is saturated with hydrogen chloride gas and refluxed for 10 hours. The reaction mixture is washed with saturated sodium bicarbonate, 8% salt solution, dried over sodium sulfate and evaporated to give 2-oxa-4-chloro-Δ⁴-androstene-3-one-17β-ol.

Similarly, by substituting 17-esters for free 17-ol compound in Example 5, the corresponding esters of 2-oxa-4-chloro-Δ⁴-androstene-3-one-17β-ol are formed.

EXAMPLE 6

*2-oxa-4-chloro-Δ⁴-androstene-3,17-dione*

Following the procedure of Example 5 but substituting 4β,5β-epoxy-2-oxa-androstane-3,17-dione for the steroid reactant, there is obtained 2-oxa-4-chloro-Δ⁴-androstene-3,17-dione.

EXAMPLE 7

*2-oxa-4-bromo-Δ⁴-androstene-3-one-17β-ol acetate*

Following the procedure of Example 4 but substituting hydrogen bromide gas for the hydrogen chloride gas, there is obtained 2-oxa-4-bromo-Δ⁴-androstene-3-one-17β-ol acetate.

Similarly, by substituting 4β,5β-epoxy-2-oxa-androstane-3,17-dione for the 4β,5β-epoxy-2-oxa-androstane-3-one-17β-ol in the procedure of Examples 4 and 5 and hydrogen bromide gas for the hydrogen chloride gas in these examples, 2-oxa-4-bromo-Δ⁴-androstene-3,17-dione is obtained, respectively.

This invention may be variously otherwise embodied within the scope of the appended claims.

What is claimed is:

1. A steroid of the formula

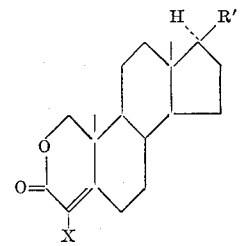

wherein X is halogen, R' is selected from the group consisting of hydroxy and the acyloxy radical of a hydrocarbon carboxylic acid of less than twelve carbon atoms, and together R and R' is keto.

2. 2-oxa-4-chloro-Δ⁴-androstene-3-one-17β-ol.

3. An ester of 2-oxa - 4 - chloro-Δ⁴-androstene-3-one-17β-ol and a hydrocarbon carboxylic acid of less than twelve carbon atoms.

4. 2-oxa-4-chloro-Δ⁴-androstene-3-one-17β-ol acetate.

5. 2-oxa-4-chloro-Δ⁴-androstene-3,17-dione.

6. 2-oxa-4-bromo-Δ⁴-androstene-3-one-17β-ol.

7. An ester of 2-oxa - 4 - bromo-Δ⁴-androstene-3-one-17β-ol and a hydrocarbon carboxylic acid of less than twelve carbon atoms.

8. A steroid of the formula

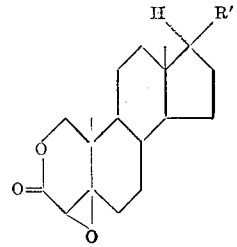

wherein R' is selected from the group consisting of hydroxy and the acyloxy radical of a hydrocarbon carboxylic acid of less than twelve carbon atoms, and together R and R' is keto.

9. 4β,5β-epoxy-2-oxa-androstane-3-one-17β-ol.

10. An ester of 4β,5β-epoxy-2-oxa-androstane-3-one-17β-ol and a hydrocarbon carboxylic acid of less than twelve carbon atoms.

11. 4β,5β-epoxy-2-oxa-androstane-3-one-17β-ol acetate.

12. 4β,5β-epoxy-2-oxa-androstane-3,17-dione.

13. A process for preparing a steroid of claim 8 which comprises interacting Δ-nortestosterone with hydrogen peroxide.

References Cited

Djerassi: Steroid Reactions, Holden-Day, Inc., San Francisco (1960) p. 621.

JAMES A. PATTEN, *Primary Examiner.*